United States Patent Office 3,592,902
Patented July 13, 1971

3,592,902
INJECTION
Nobuyasu Sato, Itami-shi, Toshio Nakamura and Hiroshi Takenaka, Ibaragi-shi, and Eiko Watabe, Ashiya-shi, Japan, assignors to Sumitomo Chemical Company, Ltd., Higashi-ku, Osaka, Japan
No Drawing. Filed Apr. 9, 1968, Ser. No. 719,840
Claims priority, application Japan, Apr. 13, 1967, 42/23,837
Int. Cl. C07d 27/38
U.S. Cl. 424—266　　　　　　　　　　4 Claims

ABSTRACT OF THE DISCLOSURE

A stable injection of an indolylaliphatic acid derivative such as N-(p-chlorobenzoyl)-2-methyl-5-methoxy-3-indolylacetic acid, N-cinnamoyl-2-methyl-5-methoxy-3-indolylacetic acid or N-nicotinoyl-2-methyl-5-methoxy-3-indolylacetic acid is prepared by dissolving the indolylaliphatic acid derivative in a non-aqueous organic solvent for injection and adding an aqueous organic amine solution containing 0.6 to 1 mole of said organic amine per 1 mole of the indolylaliphatic acid derivative to the resultant solution. The thus obtained injection is used as an anti-inflammatory drug.

---

The present invention relates to a stable injection of indolylaliphatic acid derivatives represented by the formula:

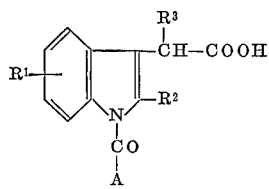

wherein $R^1$ is an alkyl having up to 3 carbon atoms, an alkoxy having up to 3 carbon atoms, a hydrogen or halogen atom, $R^2$ is a hydrogen atom or an alkyl having up to 3 carbon atoms $R^3$ is a hydrogen atom or an alkyl having up to 3 carbon atoms, and A is a phenyl group substituted by halogen atom at optional position, styryl or pyridyl.

The present indolylaliphatic acid derivatives are useful as non-steroidal antirheumatic drugs having strong anti-inflammatory, analgesic and antipyretic properties as mentioned in the specifications of Belgian Pat. Nos. 679,678 and 698,378. Some of the indolylaliphatic acid derivatives, when administered orally, produces gastroenteric troubles. Moreover, oral administration thereof hardly shows satisfactory pharmacological effects. Therefore, parenteral administration as an injection provides a very advantageous means for administration. It is difficult, however, to prepare an injection using the present indolylaliphatic acid derivatives because they are scarcely soluble in water, for example, N-(p-chlorobenzoyl-2-methyl - 5 - methoxy-3-indolylacetic acid is a weak acid of pKa 4, and the solubility in water is only 20–30 μg./ml. So they are generally used as a capsule. Although an alkali salt thereof is prepared according to method mentioned in the specification of copending application Ser. No. 719,939 filed by the present inventors on Apr. 9, 1968 and increases the solubility in water, the indolylaliphatic acid derivatives are hydrolyzed in water by acid-base catalyst such in accordance with the first-order reaction. As a result, their pharmacological activities are decreased. Furthermore, crystals deposit from a solution in the course of heat-sterilization procedure. Therefore, injection preparations for practical use could not be obtained so far. So the use of capsule and suppository have been the only means to be employed for applying the indolylaliphatic acid derivatives.

The present inventors have made a research to obtain a stable injection of indolylaliphatic acid derivatives of said formula. As a result, the present inventors have found that a stable injection can be obtained by adding an aqueous organic amine solution to a solution of a free indolylaliphatic acid derivative of said formula in an organic solvent.

One object of the present invention is to provide a process for preparing a stable injection of indolylaliphatic acid derivatives of said formula.

Another object of the present invention is to provide a stable injection of indolylaliphatic acid derivatives of said formula.

Other objects will be apparent from the following description.

In order to accomplish these objects the present invention provides a process for preparing an injection of an indolylaliphatic acid derivative of said formula, which comprises adding the indolylaliphatic acid derivative of said formula to a non-aqueous organic solvent for injection to obtain a solution containing said indolylaliphatic acid derivative, and adding an aqueous organic amine solution containing 0.6 to 1 mole of said organic amine per 1 mole of the indolylaliphatic acid derivative to the resultant solution to obtain the injection.

Further, the present invention provides a stable injection of an indolylaliphatic acid derivative of said formula prepared by the above-mentioned process.

Examples of the above-mentioned non-aqueous organic solvent for injection include glycerin, 1,3-butanediol, propylene glycol, dioxolanes, polyethylene glycols, glycofurol, dimethylacetamide, etc., and among them glycofurol and dimethylacetamide are especially advantageous for use.

Examples of the above-mentioned organic amines include alkanolamines such as ethanolamine, diethanolamine, triethanolamine, 2-dimethylaminoethanol, and 2-diethylaminoethanol; basic amino acids such as arginine and lysine; and other organic amines, and among them arginine is especially advantageous for use although its stabilization mechanism is not clear.

The present indolylaliphatic acid derivatives are produced by methods described in the specifications of the Belgian Pat. Nos. 679,678 and 698,378.

Examples of the indolylaliphatic acid derivatives include a compound of the formula wherein $R^1$ is a methyl ethyl, or methoxy group, a hydrogen atom, a chlorine atom, or a bromine atom, $R^2$ is a methyl group or a hydrogen atom, $R^3$ is a methyl, or ethyl group or a hydrogen atom, and A is a p-chlorophenyl, styryl or β-pyridyl group.

In accordance with the present invention, an injection can be prepared from an indolylaliphatic acid derivative of the formula by dissolving it in a non-aqueous organic solvent for injection, and adding thereto an aqueous solution containing 0.6–1 mole of the organic amine per 1 mole of the indolylaliphatic acid derivatives, and further if necessary, by adding an analgetics for making the injection painless.

The non-aqueous organic solvent is used in an amount sufficient to dissolve the indolylaliphatic acid derivative of said formula, and its amount varies depending on the kind of the indolylaliphatic acid derivative and the organic amine.

The aqueous organic amine solution employed in the present process is prepared by adding said organic amine to water. The amount of water is less than 50% by volume of the mixture of the indolylaliphatic acid derivative and then on-aqueous organic solvent.

If the amount of water is more than 50% by volume of the mixture of the indolylaliphatic acid derivative and the non-aqueous organic solvent, the indolylaliphatic acid derivative precipitates from the mixture, therefore it is necessary to use water in an amount of less than 50% by volume of the mixture of the indolylaliphatic acid derivative and the non-aqueous organic solvent.

An injection obtained in accordance with the present invention does neither separate precipitates nor give decomposition of the indolylaliphatic acid derivatives by heat-sterilization or by allowing to stand for long hours.

The stabilty of the injection prepared by the present invention will be explained by the following Test Examples but not limited to them.

TEST EXAMPLES

Injections of N-(p-chlorobenzoyl)-2-methyl-5-methoxy-3-indolylacetic acid and N-nicotinoyl-2-methyl-5-methoxy-3-indolylacetic acid were pepared by using the following non-aqueous solvents and a mixture of water and the following kinds and amounts of organic amines and they were stored at 50°, 60° and 70° C. and for 15 and 30 days. Water was used by 50% by volume of the mixture of the indolylaliphatic acid derivative and the non-aqueous solvent. Thereafter, the remaining rates of the indolylaliphatic acid derivatives were calculated. The results are as the following table.

EXAMPLE 2

In 500 ml. of glycofurol was dissolved 5 g. of N-p-chlorobenzoyl)-2-methyl-5-methoxy-3-indolylacetic acid. There were added thereto an aqueous arginine solution, the amount of which is equivalent to 0.6 mole of arginine, and 2% of benzylalcohol to make a 1000 ml. solution. The injection was prepared by the conventional method. pH: 6.01.

EXAMPLE 3

In 500 ml. of glycofurol was dissolved 10 g. of N-(p-chlorobenzoyl)-2-methyl-5-methoxy-3-indolylacetic acid. There were added thereto an aqueous arginine solution, the amount of which is equivalent to 0.8 mole of arginine, and 2% of benzylalcohol to make a 1000 ml. solution. The injection was prepared by the conventional method.

EXAMPLE 4

In 500 ml. of dimethylacetamide was dissolved 5 g. of N - nicotinoyl - 2-methyl-5-methoxy-3-idolylacetic acid. There were added thereto an aqueous arginine solution, the amount of which is equivalent to 0.08 mole of arginine, and 2% of benzylalcohol. The injection was prepared by the conventional method.

What is claimed is:
1. A process for preparing a pharmaceutical liquid composition for administration by injection of an indolylaliphatic acid derivative represented by the formula,

TABLE 1

| Test Experiment No. | Non-aqueous solvent | Kind of amines | Amount of amines per 1 mole of indolylaliphatic acid (mole) | Storage temp. (° C.) | Remaining rates of indolylaliphatic acid derivatives, percent, after— | | |
|---|---|---|---|---|---|---|---|
| | | | | | 0 days | 15 days | 30 days |
| 1 | Diemthylacetamide | Diethanolamine [1] | 0.8 | 50 | 100 | 100 | 94 |
| | | | | 60 | 100 | 94 | 85 |
| | | | | 70 | 100 | 81 | 58 |
| 2 | do | Diethylaminoethanol [1] | 0.8 | 50 | 100 | 97 | 94 |
| | | | | 60 | 100 | 94 | 83 |
| | | | | 70 | 100 | 82 | 60 |
| 3 | do | Arginine [1] | 0.9 | 50 | 100 | 96 | 93 |
| | | | | 60 | 100 | 94 | 88 |
| | | | | 70 | 100 | 86 | 71 |
| 4 | do | do.[1] | 0.8 | 50 | 100 | 100 | 94 |
| | | | | 60 | 100 | 96 | 90 |
| | | | | 70 | 100 | 89 | 73 |
| 5 | Glycofurol | Diethanolamine [2] | 0.8 | 50 | 100 | | 90 |
| | | | | 60 | 100 | | 74 |
| | | | | 70 | 100 | | 49 |
| 6 | do | Diethylaminoethanol [2] | 0.8 | 50 | 100 | | 88 |
| | | | | 60 | 100 | | 74 |
| | | | | 70 | 100 | | 47 |
| 7 | do | do.[1] | 0.9 | 50 | 100 | | 95 |
| | | | | 60 | 100 | | 84 |
| | | | | 70 | 100 | | 61 |
| 8 | do | Arginine [2] | 0.8 | 50 | 100 | | 94 |
| | | | | 60 | 100 | | 88 |
| | | | | 70 | 100 | | 69 |
| 9 | do | do.[1] | 0.9 | 50 | 100 | 96 | 93 |
| | | | | 60 | 100 | 94 | 88 |
| | | | | 70 | 100 | 81 | 74 |
| 10 | do | do.[1] | 0.8 | 50 | 100 | 96 | 94 |
| | | | | 60 | 100 | 95 | 88 |
| | | | | 70 | 100 | 87 | 75 |
| 11 | do | do.[1] | 0.7 | 50 | 100 | 96 | 95 |
| | | | | 60 | 100 | 96 | 90 |
| | | | | 70 | 100 | 88 | 78 |
| 12 | do | do.[1] | 0.6 | 50 | 100 | 100 | 99 |
| | | | | 60 | 100 | 97 | 94 |
| | | | | 70 | 100 | 91 | 92 |

[1] An injection of 5 mg./ml. of indolylaliphatic acid derivatives.
[2] An injection of 10 mg./ml. of indolylaliphatic acid derivatives.
NOTE.—Test Exp. Nos. 1–13 show result of stability tests of N-(p-chlorobenzoyl)-2-methyl-5-methoxy-3-indolylacetic acid and Test Exp. No. 9 shows that of N-nicotinoyl-2-methyl-5-methoxy-3-indolylacetic acid.

The process of the present invention for the preparation of injections will be explained in detail by way of the following examples which do not limit the present invention in any way. All percent are based on volume.

EXAMPLE 1

In 500 ml. of dimethylacetamide was dissolved 5 g. of N - (p - chlorobenzoyl)-2-methyl-5-methoxy-3-indolylaliphatic acid. There were added thereto an arginine aqueous solution, the amount of which is equivalent to 0.8 mole of arginine, and 2% of benzylalcohol to make a 1000 ml. solution. The injection was prepared by the conventional method. pH: 5.82.

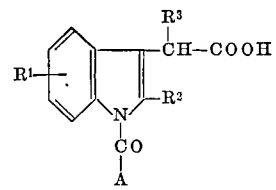

wherein $R^1$ is alkyl having up to 3 carbon atoms, alkoxy, having up to 3 carbon atoms, hydrogen or halogen; $R^2$ is hydrogen or alkyl having up to 3 carbon atoms, $R^3$ is hydrogen or alkyl having up to 3 carbon atoms; and A is halogen-substituted phenyl, styryl or pyridyl, which comprises adding the indolylaliphatic acid derivative of said formula to a non-aqueous solvent selected from the group consisting of propylene glycol, dimethylacetamide and glycofurol in an amount sufficient to dissolve the indolylaliphatic acid derivative to obtain a non-aqueous organic solution containing said indolylaliphatic acid derivative, and 2% of benzylalcohol. The injection was prepared of arginine or lysine per mole of the indolyloliphatic acid derivative to the resultant non-aqueous solution, the amount of water present being not more than 50% by volume of the non-aqueous solution of the indolylaliphatic acid derivative, to obtain the objective composition.

2. A process according to claim 1, wherein the indolylaliphatic acid derivative is N-(p-chlorobenzoyl)-2-methyl-5-methoxy-3-indolylacetic acid, N-nicotinoyl-2-methyl-5-methoxy-3-indolylacetic acid or N-cinnamoyl-2-methyl-5-methoxy-3-indolylacetic acid.

3. A pharmaceutical liquid composition for administration by injection consisting of (1) an indolylaliphatic acid derivative of the formula as defined in claim 1, (2) a non-aqueous organic solvent selected from the group consisting of propylene glycol, dimethylacetamide and glycofurol in an amount suficient to dissolve the indolylaliphatic acid derivative, and (3) arginine or lysinse in an amount of from 0.6 to 1 mole per mole of the indolylaliphatic acid derivative, and at an acceptable concentration in a water vehicle, the amount of water present being not more than 50% by volume of the solution of the indolylaliphatic acid derivative in the non-aqueous organic solvent.

4. A pharmaceutical liquid composition according to claim 3 wherein the indolylaliphatic acid derivative is N - p-chlorobenzoyl)-2-methyl-5-methovy-3-indolylacetic acid, N - nicotinoyl - 2-methyl-5-methoxy-3-indolylacetic acid or N-cinnamoyl-2-methyl-5-methoxy-3-indolylacetic acid.

References Cited
UNITED STATES PATENTS

| | | | |
|---|---|---|---|
| 2,963,404 | 12/1960 | Hammer et al. | 167—82 |
| 3,161,654 | 12/1964 | Shen | 260—326.13X |
| 3,190,889 | 6/1965 | Shen | 260—326.14X |
| 3,242,185 | 3/1966 | Shen | 260—294.8 |

JOHN D. RANDOLPH, Primary Examiner

U.S. Cl. X.R.

424—274; 260—240, 326.13, 326.14